J. V. PUGH & F. POUNTNEY.
WHEEL.
APPLICATION FILED DEC. 19, 1910.

1,148,987.

Patented Aug. 3, 1915.
2 SHEETS—SHEET 1.

Fig. 3.ᵃ

Inventors,
John V. Pugh,
Frank Pountney.

J. V. PUGH & F. POUNTNEY.
WHEEL.
APPLICATION FILED DEC. 19, 1910.
1,148,987.
Patented Aug. 3, 1915.
2 SHEETS—SHEET 2.
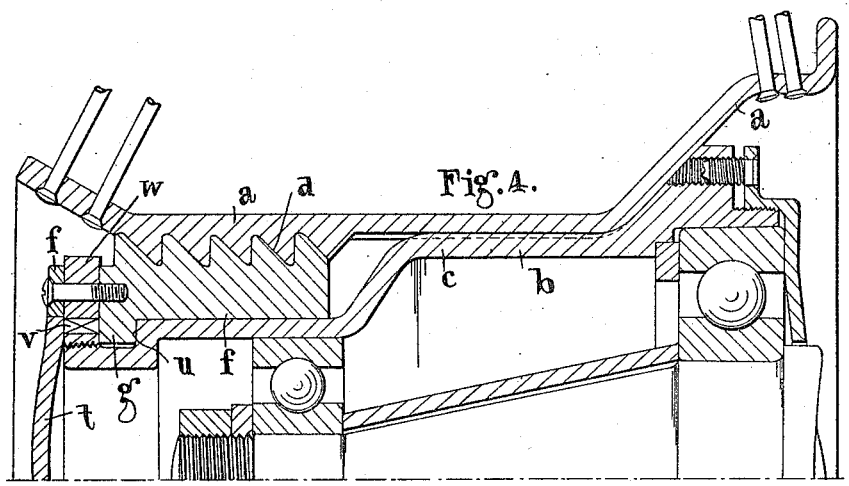
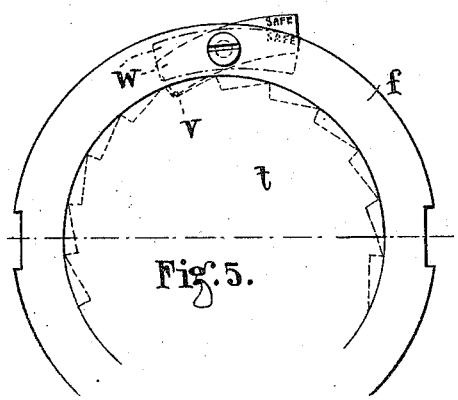

UNITED STATES PATENT OFFICE.

JOHN VERNON PUGH AND FRANK POUNTNEY, OF COVENTRY, ENGLAND.

WHEEL.

1,148,987.  Specification of Letters Patent.  Patented Aug. 3, 1915.

Application filed December 19, 1910.  Serial No. 598,137.

*To all whom it may concern:*

Be it known that we, JOHN VERNON PUGH and FRANK POUNTNEY, subjects of the King of Great Britain and Ireland, residing at Guiting House, Allesley, Coventry, in the county of Warwick, England, and 2 Barras lane, Coventry, in the county of Warwick, England, respectively, have invented certain new and useful Improvements in Wheels, of which the following is a specification.

This invention relates to detachable wheels for motor vehicles, and the like.

The object of the present invention is to provide a detachable wheel of improved and cheaper construction which shall be durable in all its parts.

The invention consists in a detachable wheel for motor vehicles and the like having an outer hub part and an inner hub part in which the ready withdrawal and replacement of the outer hub part off and on the inner hub part is effected by a single screw thread connection between the two hub parts, the thread carried by the outer part being formed directly in said hub part or upon a member rigidly fixed thereto and that of the inner hub part being formed upon a member capable of rotary but not longitudinal movement relative to this inner hub part.

The invention also consists in the various forms of detachable wheels of the above type as hereinafter indicated.

Figure 2:
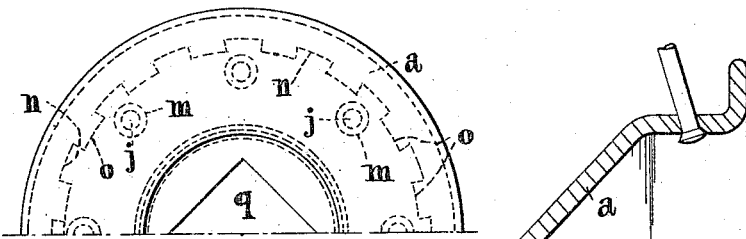
Figure 1:
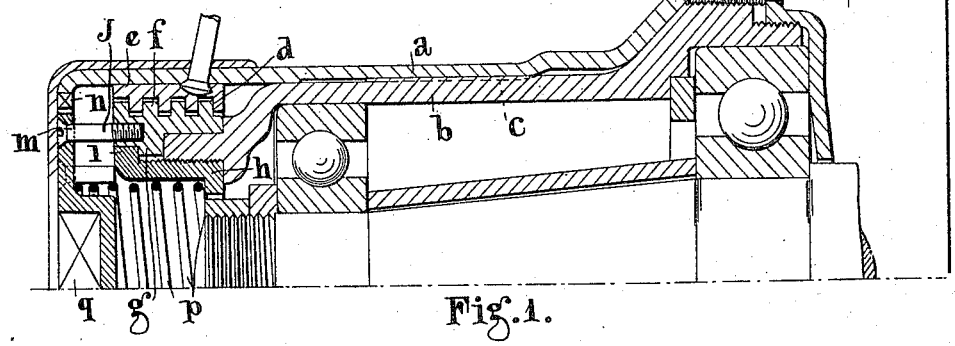
Figure 3:
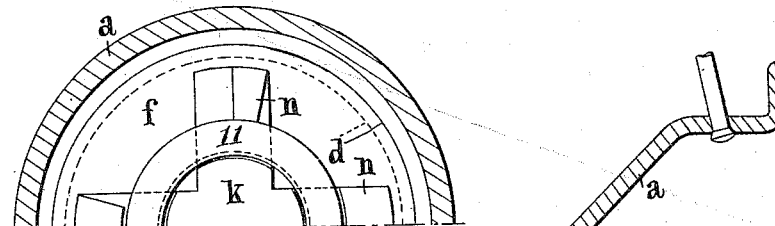
Figure 3:
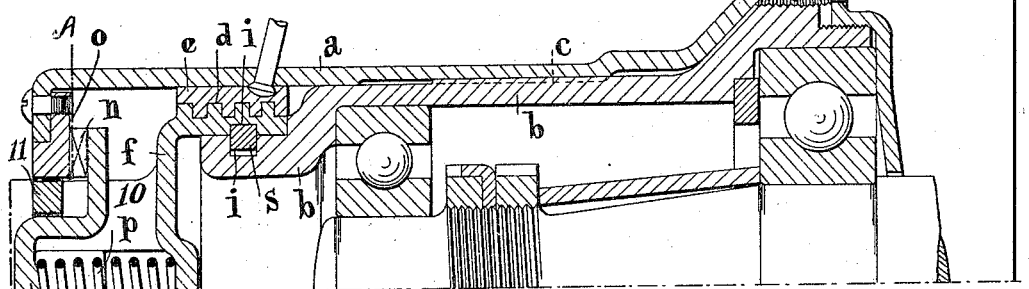

Referring now to the accompanying drawings:—Figures 1 and 2 represent one form of detachable wheel according to the present invention while, Figs. 3 and 3ª represent a modified form of the same. Figs. 4 and 5 represent a modification in which the attaching thread is of buttress form.

In carrying the invention into effect the wheel is provided with an outer hub part, $a$, and an inner hub part, $b$, the latter being mounted on ball bearings, as shown, or directly on the axle in any usual manner, the drive being transmitted from the inner hub part, $b$, to the outer hub part, $a$, by longitudinally positioned dogs or serrations, $c$.

The drawing of the outer wheel part on or off the inner hub part, $b$, is effected by a screw thread, $d$, of large pitch formed in the interior surface of the outer hub part $a$, or in an inner attachment, $e$, as shown in Fig. 1, this thread being adapted to engage with a thread of corresponding pitch formed on a member, $f$, carried by the inner hub part, $b$. This member, $f$, is cylindrical in shape and has a flange, $g$, provided in its interior surface and extending around the whole or part of the circumference thereof.

A cylindrical member, $h$, screwed into the interior of the inner hub part, $b$, has an outwardly projecting lip, $i$, around its outer end between which and the end of the inner hub part the flange, $g$, of the screwed member, $f$, is retained, thus allowing this member to rotate relatively to the inner hub part, $b$, but not to move longitudinally relatively thereto. This construction is plainly shown in Fig. 1.

In order to prevent loosening of the outer hub part when in position on the inner hub part means may be provided to lock the screwed member to the outer hub part whereby relative rotary movement of these two parts which would act to withdraw the outer hub part is not permitted.

A convenient locking engagement for the forms shown in Figs. 1 and 2 consists in arranging projecting parts on the member, $f$, which parts may take the form of screws, $j$, or be formed integral therewith and of any convenient section, and providing a cap, $k$, having correspondingly shaped holes or slots, $m$, therein into which these screws, $j$, are adapted to extend. The cap, $k$, is formed dish-shaped inward of a form convenient to allow of its being rotated by a key, brace or the like such as the square shaped opening, $q$, shown in Fig. 2 and further is provided with ratchet teeth, $n$, around its periphery capable of engagement with similar teeth, $o$, formed in a part of the outer hub member, $a$. The cap, $k$, is held in engagement with the outer hub part by a spring, $p$, or the like and in such a locked position it will be seen that the thread carrying member, $f$, cannot rotate relatively to the outer hub part, $a$. Any convenient means may be provided to retain the cap, $k$, on the inner hub part, $b$, when the outer hub part $a$, is removed. In the present modification this is effected by the heads of the screws, $j$, which fit into the countersunk holes in the cap, $k$.

The operation of withdrawing the outer hub part or wheel is as follows:—The key or brace adapted to rotate the cap, $k$, is inserted in the opening, $q$, provided in the cap for this purpose and the cap is then pressed inward against the action of the spring, $p$, thereby disengaging the cap teeth, $n$, from the teeth, $o$, on the outer hub part, $a$. The cap $k$, can now be freely turned and this causes the rotation of the thread carrying member, $f$, relative to the inner hub part, $b$, and since this member, $f$, is only capable of rotation, the outer hub part, $a$, is caused to move longitudinally off the inner hub part, $b$, until the wheel becomes disengaged from the latter.

It will be seen that the method of rotatably mounting the thread carrying member, $f$, so that it cannot move longitudinally relative to the inner hub part, $b$, may be modified, for instance as shown in Figs. 3 and 3ª, the latter being a part section on line A A of the former, grooves, $i$, may be formed in this member, $f$, and in the inner hub part, $b$, and a compressible ring, $s$, or the like placed within both grooves. A cylindrical part 10, projecting from the member, $f$ is provided with a screw thread to carry the circular nut 11, wide slots are also formed therein to receive the cap, $k$, which in this case is divided into four arms each provided at their ends with teeth $n$ to engage the teeth, $o$, carried on the end of the outer hub part. Parts in this figure similar to those shown and described with regard to Figs. 1 and 2 are indicated by similar reference letters.

In order to enable access to be had to the interior of the inner hub part, $b$, and also for the purpose of allowing lubrication to be effected without removing the outer hub part and therefore while the vehicle or car is properly supported by its wheels, the modification shown in Figs. 4 and 5 may be adopted. The end of the inner hub part, $b$, is reduced in diameter and screwed externally to receive a suitable cap, $t$, this thread being of comparatively fine pitch and preferably left-handed. The screwed member, $f$ is provided as before with an internal flange, $g$, extending around the whole of its inner surface or at intervals thereof, this flange being retained in the groove or channel between the end of the cap, $t$, and the shoulder, $u$, formed by the reduction in diameter of the inner hub part, $b$, thus as before allowing rotary but not longitudinal movement of this screwed member, $f$, relative to the inner hub part, $b$. The thread, $d$, by which this screwed member, $f$, engages with the outer hub part, $a$, is of the same hand but of much larger pitch than that by which the cap, $t$, is screwed on to the inner hub part, $b$, and is preferably, as shown, of buttress formation. Ratchet teeth, $v$, are formed on the external surface of the cap, $t$, as shown, or on a part of either the outer or inner hub parts with which teeth one or more pawls, $w$, carried by the screwed member, $f$, are adapted to engage for the purpose of locking the outer hub, $a$, in position on the inner part $b$, the pawl or pawls, $w$, also act to prevent the unscrewing of the cap, $t$, when the ratchet teeth, $v$, are formed therein. The outer hub part, $a$, is withdrawn off the inner hub part, $b$, by disengaging the pawl or pawls $w$, from the ratchet teeth, $v$, and then rotating the screwed member, $f$, in one direction, viz., to the left or anticlockwise when left handed threads are employed. Rotation of the screwed member, $f$, in the other direction causes the outer hub part, $a$, to be drawn onto the inner hub part, $b$, the pawls, $w$, overrunning the ratchet teeth, $v$, during this movement, and locking the outer hub part, $a$, against loosening when in position.

Means such as recesses or the like are provided for rotating the screwed member, $f$, and any suitable form of spanner which will disengage the pawl, $w$, from the teeth $v$, when in position for unscrewing said member and leave the pawl free to overrun the teeth when in position for screwing it up may be employed.

When the ratchet teeth, $v$, are formed in the cap, $t$, itself, as shown, this cap, $t$, can be removed from the inner hub part, $b$, after the pawl, $w$, have been disengaged therefrom; on being screwed in it overruns the pawls and is locked in position thereby. One or more grub screws, cotter pins or the like may be provided to prevent the rotation of the cap which might occur while the outer hub was being put on if a very strong spring was used to press on the pawls and the cap piece was not screwed on very tightly. Accidental loosening of the outer hub, $a$, by the rotation of the screwed member, $f$, in a direction to withdraw itself from the outer hub part and in so doing taking the cap, $t$ with it, which might even allow the wheel to come entirely off, is prevented by the difference in pitch of the thread on the screwed member and that on the cap.

The pawl or pawls, $w$, are preferably provided with means, as shown, to indicate when they are in engagement with the cap ratchet teeth, $v$.

Although in these drawings non-driving wheels are illustrated, it must be understood that in the case of driving wheels, the drive is transmitted to the inner hub part by means of a live axle, chain wheel or other usual means, and further that the brake drum when one is fitted is mounted either on the inner hub part or on the detachable wheel. In such cases the connection between the two hub parts may be arranged between this chain wheel or brake drum and the outer hub part, this connection being arranged in any desired or convenient manner.

It will be seen that many modifications may be made in carrying the invention into effect without in any way departing from the spirit of the same.

Having now described our invention what we claim as new and desire to secure by Letters Patent is:—

1. In combination in a detachable wheel for vehicles, a permanent inner and a removable outer hub part, a cylindrical surface having a concentric groove formed on said inner hub part, a screw-threaded securing device accurately fitting and rotatable on said surface, a ring extending internally from said securing device rotatably engaging in said groove, and an internal screw thread in said outer hub part which is engaged by said securing device.

2. In combination in a detachable wheel for vehicles, a permanent inner and a removable outer hub part, an extended cylindrical surface having a concentric groove formed on said inner hub part, a securing device accurately fitting and rotatable on said surface, an internal collar in said securing device engaging said groove, an outwardly pointing conical abutment surface at the inside end of the permanent hub part, buttress screw threads covering the external surface of said securing device and arranged to constitute inwardly pointing approximately conical abutment surfaces, and internal surfaces in the outer hub part to engage said abutment and screw thread surfaces whereby said outer hub part is firmly supported and centered by surfaces of large area.

3. In combination in a detachable wheel for vehicles, a permanent inner and a removable outer hub part, an extended securing device accurately fitting and rotatable, but longitudinally held upon said inner hub part, an outwardly pointing conical abutment surface at the inside end of the permanent hub part, buttress screw threads covering the external surface of said securing device and arranged to constitute inwardly pointing approximately conical abutment surfaces and internal surfaces in the outer hub part to engage said abutment and screw thread surfaces whereby said outer hub part is firmly supported and centered by surfaces of large area.

4. In combination in a detachable wheel for vehicles, a permanent inner and a removable outer hub part, an outwardly pointing conical abutment surface at the inside end of the permanent hub part, a securing device having buttress screw threads inclined oppositely to said conical abutment retained upon said inner hub part, and internal surfaces in said outer hub part to engage said abutment and said screw thread surfaces whereby said outer hub part is firmly supported and centered by inclined surfaces of large area.

In testimony whereof, we affix our signatures in presence of two witnesses.

JOHN VERNON PUGH.
FRANK POUNTNEY.

Witnesses:
ALBERT BROWN,
JOHN RAVEN.

Copies of this patent may be obtained for five cents each, by addressing the "Commissioner of Patents, Washington, D. C."